Nov. 20, 1934.  A. J. SCHMITT  1,981,671
ELECTRICAL CONTROLS FOR VEHICLE DIRECTION INDICATORS
Filed Feb. 27, 1933
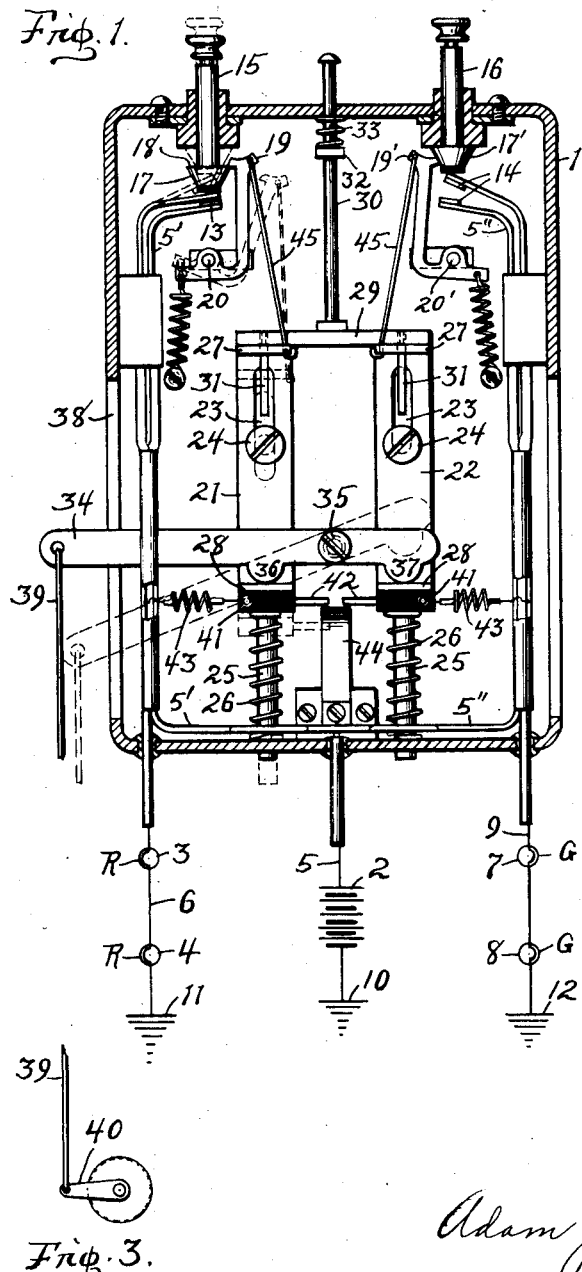
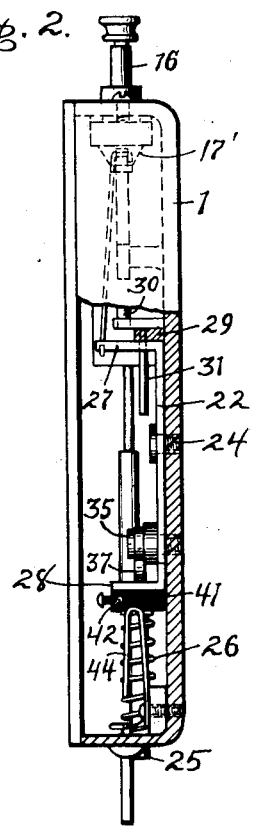
Adam J. Schmitt INVENTOR.
BY
ATTORNEY.

Patented Nov. 20, 1934

1,981,671

UNITED STATES PATENT OFFICE 1,981,671

ELECTRIC CONTROLS FOR VEHICLE DIRECTION INDICATORS

Adam J. Schmitt, Fort Wayne, Ind.

Application February 27, 1933, Serial No. 658,771

1 Claim. (Cl. 200—59)

This invention relates to improvements in electric controls for vehicle direction indicators of that type wherein electric lamps or other electrically operated signaling indicators are controlled by manually closing the circuits for the indicators selectively according to the intended change in the direction of travel of the vehicle, and wherein automatically operated mechanism is provided to cause re-opening of the closed circuits upon resumption of the vehicle to a straight course.

One of the objects of the invention is to provide a controlling switch mechanism for electric direction indicators on a vehicle whereby the indicators become energized selectively at the will of the operator to thereby signify his intention of turning to the left or right and which indicators will remain energized thereafter until the indicated turn shall have been completed and a straight course resumed.

Other objects and advantages of the invention will appear in the following description.

An illustrative embodiment of the invention is shown in the accompanying drawing, in which:—

Fig. 1 is an elevation of a switch-controlling mechanism with parts shown in section, including also electrically operated indicators and a source of energy in diagrammatical form connected with said mechanism, parts being in section;

Fig. 2 is a side elevation of the switch-controlling mechanism, a portion thereof being broken away; and Fig. 3 is a detail view of the steering arm of an automobile and a rod that forms the connection between the steering arm and the operating lever for the switch controlling mechanism.

The illustrative embodiment of the invention consists of a housing 1 in which is contained the controlling mechanism for two separate normally open electrical circuits. One of said circuits has connected in line therewith a battery 2 and signal lamps 3 and 4 by means of a feed wire 5 and a service wire 6, the closing of which circuit is subject to operation of said controlling mechanism. The other of said circuits has connected in line therewith the battery 2, and signal lamps 7 and 8, by means of the feed wire 5 and a service wire 9, the closing of this circuit being also subject to operation of said controlling mechanism. The battery 2 and each of said service wires 6 and 9 are grounded respectively as indicated by 10, 11 and 12.

The controlling mechanism consists of two pairs of primary contactors 13 and 14 that are normally open, or separated, and the members of which are connected respectively with the feed wire 5 and the corresponding service wires 6 or 9. The contactors 13 are disposed in line with and conveniently insulated from an operating push-rod 15 that is movably disposed in the housing and are arranged so that when pressure is applied to said push-rod by the operator the contactors are closed and the service wire 6 and the lamps 3 and 4 consequently become energized.

The contactors 14 are disposed in line with and insulated from an operating push-rod 16 that is movably disposed in the housing arranged so that when pressure is applied to the push-rod by the operator the contactors 14 are closed whereupon the lamps 7 and 8 consequently become energized.

Upon the inner end of the push-rod 15 is secured a taper plug 17, the outer wall of which extends divergently upward to an annular shoulder 18 formed thereon, and a spring-actuated latch 19 mounted on a pivot 20 in the housing is arranged to have locking engagement with said shoulder when said push-rod is thrust inwardly whereupon the contactors 13 are held in closed position until the latch 19 is withdrawn from its locking engagement.

The inner end of the push rod 16 has a taper plug 17' secured thereon similar to that on the other push-rod 15 and which is engaged by a spring-actuated latch 19' that is mounted upon a pivot 20'. Thus, when the push-rod 16 is thrust inwardly the contactors 14 are held in closed position because of the locking engagement of the latch 19' with the plug 17'.

Within the housing are disposed two vertically movable slides 21 and 22, each having a guide slot 23 through which a corresponding screw 24 extends. The screws are firmly secured in the back wall of the housing and serve as guides for the upper portions of said slides. Also, each slide has a vertical stem 25 that projects from its lower end and extends loosely through the lower wall in which it has guided movement. A compression spring 26 is disposed upon each stem 25 between the corresponding slide and the bottom wall of the housing whereby said slides are held normally in their uppermost positions.

Each slide has at its upper end a ledge 27 and at its lower end a similar ledge 28. Upon the upper ledges 27 is disposed a cross-bar 29 provided with an operating rod 30 that extends loosely through the top wall of the housing. The cross-bar has pendent pins 31 that extend loosely through said upper ledges respectively, by means of which turning movement of the operating rod upon its axis is prevented. The operating rod has thereon a collar 32, and a cushion spring 33 is disposed upon said rod between said collar and the top wall of the housing, which prevents rattling of the operating rod.

An actuating lever 34 is mounted upon a stud 35 that projects from the back of the housing at a point midway between the slides 21 and 22, and constitutes a fulcrum for said lever. The actuating lever has two pendent lugs 36 and 37 that normally bear respectively upon the lower ledges 28 on said slides so that when said lever is tilted upon its fulcrum one or the other of said slides is moved downwardly dependent upon the direction in which the said lever is actuated. One end of the lever 34 extends through a slot 38 made in the side wall of the housing and has connection by means of a rod 39 with a steering arm 40 such as ordinarily forms part of the steering gear of an automobile. Thus, when the steering arm is moved in one direction or the other, as when turning the automobile to the right or left, the operating lever 34 is tilted upon its fulcrum causing movement of one or the other of the slides accordingly.

Each of the slides 21 and 22 has secured thereon a block 41 of insulating material which is provided with a pin 42 that has electrical connection with the corresponding service wires 6—9 as indicated by 43 and which has electrical contact, when the corresponding slide is moved to its lowermost position, with a spring tongue contactor 44 that is mounted in the housing, and the tongue has electrical connection with the feed wire 5, so that when contact is made between the pins 42 and the spring tongue contactor 44 current is supplied from the battery to the corresponding service wire 6—9.

The upper ledges 27 on said slides are operatively associated with the respective lock latches 19—19' by corresponding connections 45 arranged so that downward movement of said slides is acompanied by movement of their connected latches from their push-rod engaging positions.

In use, the housing is mounted in an automobile (not shown) within convenient reach of the driver, and the signal members or lamps 3, 4, 7 and 8 are arranged suitably on the automobile so as to be conspicuously displayed and are connected with the corresponding service wires. Thus, the lamps 3 and 7 may be mounted upon the front of the automobile at the respective opposite sides thereof, and the lamps 4 and 8 are likewise mounted at the rear of the automobile. Preferably, the lamps are colored. For example, the lamps 3 and 4 may be colored red to signify when lighted a left hand turn, and the lamps 7 and 8 may be colored green to signify when lighted a right hand turn.

In signaling, when it is the intention to turn toward the left hand, the push-rod 15 is manually thrust into locking engagement with its latch 19 which causes the contactors 13 to close, whereupon current from the battery 2 is supplied through the feed wires 5 and 5' and the service wire 6 to the red signal lamps 3 and 4 which are then energized and remain lighted while the plug 17 on the push-rod 15 is locked by its latch 19. Subsequently, when the automobile is steered in the intended course, making a left hand turn, the actuating lever 34 is automatically tilted because of its operative connection with the steering arm 40 which is moved in the ordinary manner in effecting such turn. Thus, the slide 21 is moved by the lever 34 downwardly, causing the corresponding pin 42 to contact with the spring tongue 44, whereupon current is supplied from the battery by the feed wire 5 to the service wire 6 through the medium of the corresponding connection 43. Also, coincident with the downward movement of the slide 21 the latch 19 is automatically moved from its locking engagement with the plug 17 which permits the contactors 13 to re-open and the push-rod 15 to reassume its normal position. When the automobile is steered again into a straight course, the actuating lever 34 is moved to its normal position by the action of the steering arm 40, whereupon the slide 21 is returned to its uppermost position by reaction of its spring 26, and contact of the corresponding pin 42 with the spring tongue 44 is broken so that supply of current to the signal lamps 3 and 4 is thereby shut off.

The other signal lamps 7 and 8, when a right hand turn is intended, are likewise energized upon manual operation of the push-rod 16 by current supplied from the battery through the feed-wires 5—5", contactors 14 and service wire 9, and when the right hand turn is subsequently made the actuating lever is automatically tilted by action of the steering arm 40 in the direction opposite to that in the previous instance. Thus, the slide 22 is moved downwardly by the lever 34, causing the corresponding pin 42 to contact with the spring tongue 44, whereupon current is supplied from the battery by the feed wire 5 to the service wire 9 through the medium of the corresponding connection 43. Also, the push-rod 16 is released and the contactors reopen as the push-rod is raised to its normal position. As the automobile is subsequently steered into a straight course the actuating lever is returned automatically to its normal position, through action of the steering arm, thus permitting the slide 22 to return to its uppermost position, whereupon contact of the corresponding pin with the spring tongue 44 is broken and the lamps 7 and 8 are consequently extinguished.

Independent of the circuit closing manually operated push rods, the service wires 6 and 9 become charged and the corresponding signal lamps are lighted automatically as the automobile is steered from a straight course to the right or left, and subsequently the lamps are automatically extinguished upon resumption of the automobile to a straight course.

In the event either of the push rods are operated accidentally or otherwise, and the corresponding lamps are thereby lighted, extinguishment of the lamps is accomplished by thrusting the operating rod downwardly, thus causing like movement of the slides and consequent disengagement of the latches 19—19' from the plugs on the push rods, which permits the contactors 13 and 14 to reopen and thereby the current supplied to the service wires is shut off.

By the invention herein set forth are provided lamps that are automatically lighted to signify right or left hand turns of a traveling vehicle from a straight course, upon making such turns, and that are automatically extinguished when the vehicle resumes a straight course. Also, there is provided the manually operated means by which the signal lamps are lighted preliminary to turning the vehicle from a straight course. In this manner the course of travel of the vehicle intended by the driver is indicated in advance of a turning movement thereof, the indication is automatically sustained during such turning movement, and the indication is automatically discontinued upon completion of the turning movement.

I claim:—

In a control for an electrical signal system, separately operable push-rod members, electrical contactors disposed to be closed respectively by said members when said members are manually operated, spring-restrained latches arranged to lock said members respectively when moved to contact closing position, spring-restrained slides each operatively connected with a corresponding one of said latches and each having an insulated pin, another contactor disposed to have contact with said pins respectively upon operation of said slides, a lever disposed to selectively move said slides accordingly as actuated and having operative connection with the steering mechanism of a vehicle, and operating means for actuating said slides independent of said lever, said contactors and pins having suitable connections with an electrical signal system on said vehicle.

ADAM J. SCHMITT.